United States Patent [19]

Dreyer

[11] Patent Number: 5,743,134
[45] Date of Patent: Apr. 28, 1998

[54] METHOD AND ARRANGEMENT FOR DETERMINING AND/OR MONITORING A PREDETERMINED LEVEL OF MATERIAL IN A CONTAINER

[75] Inventor: Volker Dreyer, Lörrach, Germany

[73] Assignee: Endress + Hauser GmbH + Co., Germany

[21] Appl. No.: 522,389

[22] PCT Filed: Jan. 19, 1995

[86] PCT No.: PCT/EP95/00195

§ 371 Date: Sep. 25, 1995

§ 102(e) Date: Sep. 25, 1995

[87] PCT Pub. No.: WO95/20749

PCT Pub. Date: Aug. 3, 1995

[30] Foreign Application Priority Data

Jan. 26, 1994 [DE] Germany ............ 44 02 234.4

[51] Int. Cl.⁶ .................................... G01F 23/28
[52] U.S. Cl. .............................. 73/290 V; 73/1 DV
[58] Field of Search ............... 73/290 V, 1 DV, 73/610, 597, 599, 600, 614, DIG. 1; 367/97; 340/621, 618

[56] References Cited

U.S. PATENT DOCUMENTS 4,594,584 6/1986 Pfeiffer ........................ 340/620
4,896,535 1/1990 Duckart ........................ 73/290 V
5,269,188 12/1993 Esin ............................ 73/1 DV

*Primary Examiner*—Christine K. Oda
*Attorney, Agent, or Firm*—Bose McKinney & Evans

[57] ABSTRACT

The determining and/or monitoring of a predetermined level of material in a container is implemented with the help of a level sensor having a mechanical oscillatory structure, an electromechanical excitation transducer and an electromechanical reception transducer. The reception transducer is connected to the input of an amplifier circuit, to the output of which the excitation transducer is connected, so that the mechanical oscillatory structure is excited to oscillate at its self-resonant frequency. The mechanical oscillatory structure is mounted at the height of the predetermined level of material in such a way that it comes into contact with this material when said material reaches the predetermined level, which causes the self-resonant frequency to change. The change in the self-resonant frequency is detected by an evaluation circuit connected to the output of the amplifier circuit. To detect faults which cannot be detected from the size of the frequency measured, the connection between the output of the amplifier circuit and the excitation transducer is interrupted briefly at predetermined test intervals, and in each test interval a phase comparison is carried out between the output signal of the amplifier circuit and a signal picked up at the excitation transducer.

8 Claims, 4 Drawing Sheets

METHOD AND ARRANGEMENT FOR DETERMINING AND/OR MONITORING A PREDETERMINED LEVEL OF MATERIAL IN A CONTAINER

BACKGROUND OF THE INVENTION

The invention relates to a method for determining and/or monitoring a predetermined level of material in a container with the help of a level sensor having a mechanical oscillatory structure, an electromechanical excitation transducer and an electromechanical reception transducer, the mechanical oscillatory structure being mounted at the height of the predetermined level of material in such a way that it comes into contact with this material when said material reaches the predetermined level, and the reception transducer being connected to the input of an amplifier circuit, whose output is connected to the excitation transducer and which is designed in such a way that the mechanical oscillatory structure is excited to oscillate at its self-resonant frequency, an evaluation circuit being connected to the output of the amplifier circuit for causing display and/or switching operations depending on the frequency of the output signal of the amplifier circuit, as well as to an arrangement for implementing the method.

A method of this kind is disclosed in the published German patent application 33 36 991, with the mechanical oscillatory structure having two oscillatory rods which are attached to a diaphragm and which are placed in a state of opposite vibrations. When the oscillatory structure oscillates in air, it has a higher self-resonant frequency than when it is in contact with the material. This phenomenon is exploited to indicate and/or monitor the predetermined level of material. The evaluation circuit compares the instantaneous frequency of the output signal of the amplifier circuit, which is always identical with the current self-resonant frequency of the mechanical oscillatory structure, with a nominal frequency, which is identical with the self-resonant frequency which the oscillatory structure has when it oscillates in air, and which is recorded, for example, during manufacture or installation of the level indicator sensor. If this instantaneous frequency is lower than the nominal frequency by more than a predetermined difference, it is assumed that the mechanical oscillatory structure is in contact with the material, that is, that the level to be monitored in the container has been reached or exceeded, whereas otherwise it is assumed that the mechanical oscillatory structure is oscillating in air, that is, that the level to be monitored in the container has not been reached.

The evaluation circuit can also detect certain faults in the level monitoring arrangement from the frequency determined by it. If the frequency measured is zero, this means a complete failure of the device. If the frequency measured is significantly higher than the nominal frequency, then it can be suspected that the oscillatory rods have been shortened through corrosion or breakage. In such cases, the evaluation circuit can give an alarm signal.

However, there are also faults that cannot be detected in this way, because they can lead to frequency values that are within the range of possible frequency values. Such faults can be caused, for example, by long-term changes (degradation) and ageing phenomena in the components of the sensor and in the circuit components of the electronic circuit arrangement. If the oscillation frequency of the sensor is reduced by such a fault, it is possible for the evaluation circuit erroneously to indicate that the oscillatory rods are covered by the material, that is, that the predetermined level has been reached, even though the oscillatory rods are in fact oscillating in air. If, on the other hand, the oscillation frequency of the sensor is increased by such a fault, it is possible for the evaluation circuit erroneously to indicate that the oscillatory rods are oscillating in air, even though the oscillatory rods are in fact covered by the material.

The object of the invention is to provide a method of the type mentioned above, with which faults which cannot be detected from the value of the frequency measured can still be detected, as well as an arrangement for implementing the method.

SUMMARY OF THE INVENTION

To achieve this object, the method in accordance with the invention is characterised in that the connection between the output of the amplifier circuit and the excitation transducer is interrupted briefly during predetermined test intervals, and that a phase comparison is carried out in each test interval between the output signal of the amplifier circuit and a signal picked up at the excitation transducer, in order to detect faults in the measuring line.

The effect obtained with this method is based on the fact that after the interruption of the connection between the output of the amplifier circuit and the excitation transducer in the test interval, the oscillations of the mechanical oscillatory structure do not stop immediately, but die out gradually, with, however, the excitation transducer also working as a reception transducer and converting the mechanical oscillations into an electrical output signal. While the excitation signal supplied by the amplifier circuit to the excitation transducer is out of phase by 90° in relation to the reception signal supplied by the reception transducer during normal measuring operation, so that the self-excitation condition is fulfilled, the signals supplied by the two transducers in the test interval are in phase. Depending on the design of the circuit, there must be a predetermined phase relationship in the test interval between the output signal of the amplifier circuit and the signal picked up at the excitation transducer if the arrangement is free of faults. Faults in the arrangement can be recognised and identified from noncompliance with this phase relationship and, if necessary, from the size of the phase displacement.

A device for implementing the method comprising a level sensor containing a mechanical oscillatory structure, an electromechanical excitation transducer and an electromechanical reception transducer, the mechanical oscillatory structure being mounted at the height of the predetermined level of material in such a way that it comes into contact with this material when said material reaches the predetermined level, and the reception transducer being connected to the input of an amplifier circuit, whose output is connected to the excitation transducer and which is designed in such a way that the mechanical oscillatory structure is excited to oscillate at its self-resonant frequency, an evaluation circuit being connected to the output of the amplifier circuit for causing display and/or switching operations depending on the frequency of the output signal of the amplifier circuit, is characterised in accordance with the invention in that a switch is inserted in the connection between the output of the amplifier circuit and the excitation transducer, that a control circuit is provided for opening the switch briefly during predetermined test intervals, and that the evaluation circuit is designed in such a way that it carries out a phase comparison in each test interval between the output signal of the amplifier circuit and a signal picked up at the excitation transducer, in order to recognise faults in the measuring line.

3

Further features and advantages of the invention can be seen from the following description of embodiments on the basis of the drawings. In the drawings:

DESCRIPTION OF THE PREFERRED EMBODIMENT(S)

Figure 1:
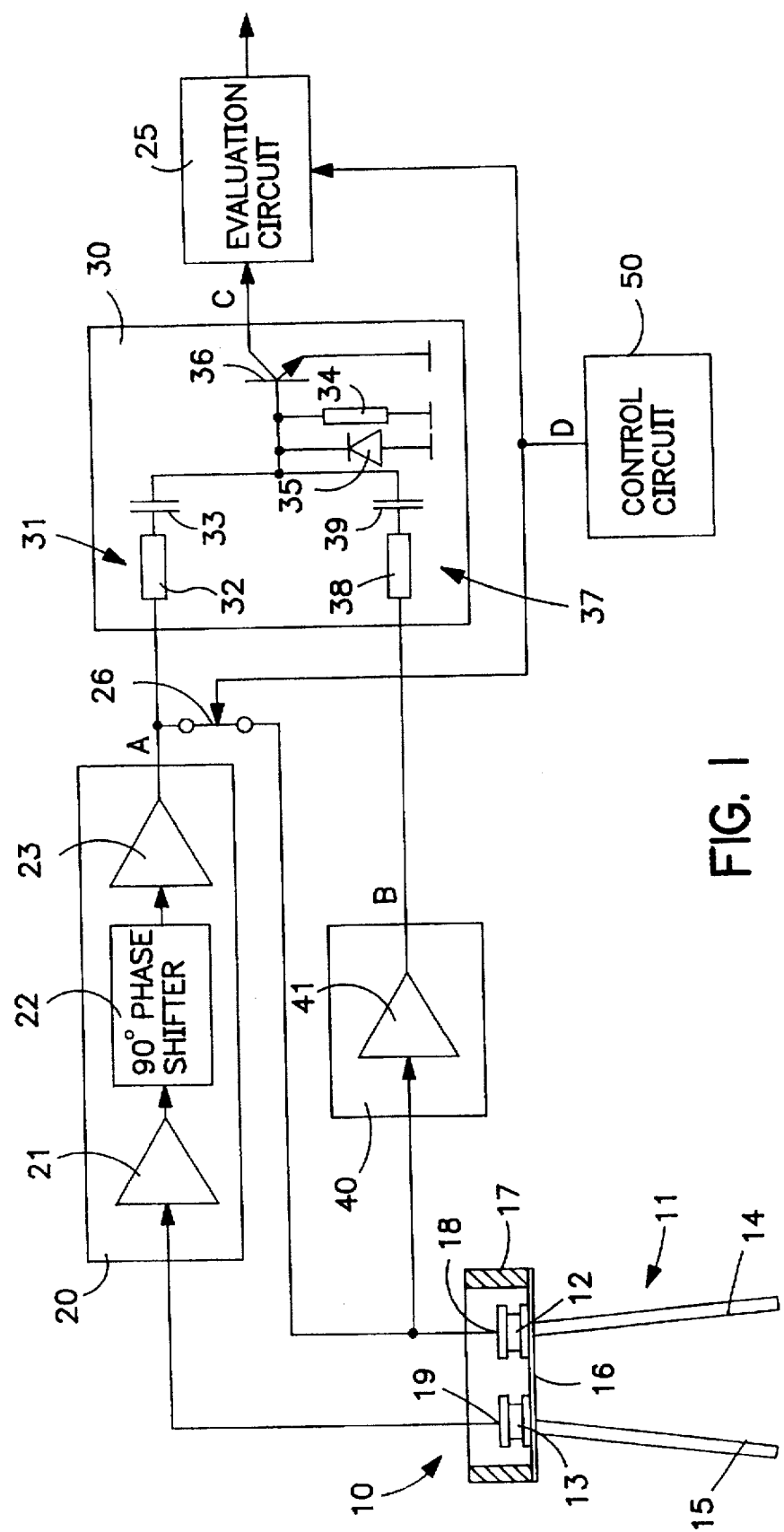
FIG. 1 illustrates the block diagram of an arrangement for determining and/or monitoring a predetermined level of material in a container in accordance with an embodiment of the invention.

FIG. 1 of the drawing shows a level sensor 10 comprising a mechanical oscillatory structure 11, an electromechanical excitation transducer 12 and an electromechanical reception transducer 13. The mechanical oscillatory structure 11 in the illustrated embodiment consists of two oscillatory rods 14 and 15, each of which is attached at one end to a common diaphragm 16, which is connected to an annular screw-in piece 17 around its circumferential edge. Each of the two electromechanical transducers 12, 13 is designed in such a way that it can convert an applied electrical alternating signal (alternating voltage or alternating current) into a mechanical oscillation, and conversely can convert a mechanical oscillation acting on it into an electrical alternating signal. As an example it is assumed that each transducer 12, 13 is a piezoelectric transducer containing at least one piezoelectric element. As is well known, such a piezoelectric element consists of a disc-shaped piezoelectric crystal located between two electrodes. The thickness of the piezoelectric crystal varies depending on the voltage applied to the electrodes, and conversely, mechanically constrained changes in thickness produce an electric voltage at the electrodes. The excitation transducer 12 is connected to the diaphragm 16 in such a way that due to the thickness oscillations of its piezoelectric crystal, which are produced by applying an electrical alternating voltage, it excites the diaphragm to oscillations which are transmitted to the two oscillatory rods, so that these oscillatory rods carry out opposite mechanical oscillations transversely of their longitudinal direction. The reception transducer 13 is connected to the diaphragm 16 in such a way that due to the mechanical oscillations of the diaphragm and of the oscillatory rods, an electrical alternating voltage is produced between its two electrodes.

One electrode each of each of the two transducers 12, 13 is connected to an earth connection, which for example may be formed by the diaphragm 16 and the screw-in piece 17. The other electrodes form a terminal 18 for the excitation transducer 12 and a terminal 19 for the reception transducer 13, respectively. The terminal 19 for the reception transducer 13 is connected to the input of an amplifier circuit 20, whose output is connected to the terminal 18 for the excitation transducer 12. The level sensor 10 with the two transducers 12, 13, which are coupled to each other by the mechanical oscillatory structure 11, is thus inserted in the feedback loop of the amplifier circuit 20. The amplifier circuit 20 is designed in such a way that the self-excitation condition is fulfilled, so that the mechanical oscillatory structure 11 is excited to oscillations with its self-resonant frequency

4 through the two transducers 12 and 13. For this purpose, the amplifier circuit 20 contains a preamplifier 21, which amplifies the output signal of the reception transducer 13, a 90° phase shifter 22, which imparts a phase rotation of 90° to the output signal of the preamplifier 21, and an output amplifier 23, which supplies an alternating voltage at the output with the correct frequency, phase angle and amplitude for maintaining the oscillations of the mechanical oscillatory structure 11.

To determine whether the material in a container has reached a predetermined level, the level sensor 10 is mounted on the container in the known manner in such a way that the two oscillatory rods 14, 15 come into contact with the material when said material has reached the predetermined level. If the predetermined level in the container has not yet been reached, the two oscillatory rods 14, 15 oscillate in air. In this case, the self-resonant frequency of the mechanical oscillatory structure 11 has a known value, which may be, for example, 420 Hz. If, on the other hand, the two oscillatory rods 14 and 15 come into contact with the material, the self-resonant frequency of the mechanical oscillatory structure decreases; it may amount to approximately 340 Hz, for example, if the two oscillatory rods are completely covered by the material. With the help of the frequency of the output signal of the amplifier device 20, which is always identical to the oscillation frequency of the mechanical oscillatory structure 11, it is possible to determine whether the material in the container has reached the predetermined level or not. This is determined by an evaluation circuit 25.

Figure 2:
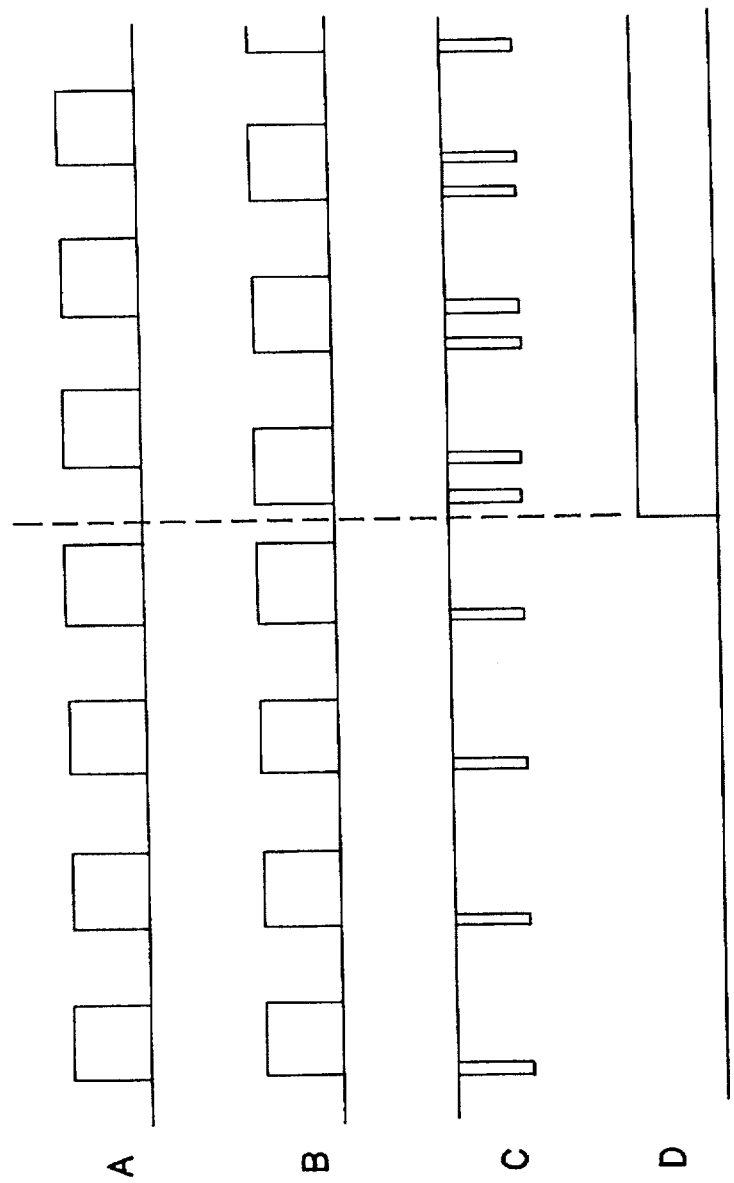
FIG. 2 illustrates time-dependency diagrams of signals occurring in the arrangement of FIG. 1.

In accordance with a conventional design, the output amplifier 23 is a limiter amplifier which supplies a square-wave voltage at the output, as illustrated in diagram A of FIG. 2. For reasons of simplification, the square-wave voltage is also designated by the letter A. The square-wave voltage A is supplied to the terminal 18 of the excitation transducer 12. The same square-wave voltage A is also supplied to the input of a differentiating circuit 30, which converts the square-wave voltage A into a pulse train whose repetition frequency is identical to the frequency of the square-wave voltage. For this purpose, the differentiating circuit 30 contains a differentiating element 31, which is formed from a series connection of a resistor 32 and a capacitor 33. The differentiating element 31 is connected in series with a resistor 34, to which a diode 35 is connected in parallel, between the output of the amplifier circuit 20 and earth. The connection point between the differentiating element 31 and the parallel circuit 34-35 is connected to the base of a transistor 36, whose emitter is connected to earth. The collector of the transistor 36 forms the output of the differentiating circuit 30, which is connected to the input of the evaluation circuit 25.

The differentiating element 31 produces a short pulse for each edge of the square-wave signal A, these pulses being alternately positively and negatively directed. The transistor 36, which is normally disabled, becomes briefly live through every positively directed pulse, while negatively directed pulses have no effect, so that the train of negatively directed short pulses illustrated in the left-hand part of diagram C of FIG. 2 arises at the output formed by the collector; these pulses coincide in time with the rising edges of the square-wave signal A. This pulse train C is applied to the evaluation circuit 25, which therefrom can easily determine the frequency of the square-wave signal A, for example by counting the pulses occurring in predetermined intervals. The frequency measured is compared with a nominal frequency, which is stored in the evaluation circuit 25. This nominal frequency is the self-resonant frequency which the level sensor 11 has when it is in perfect order and is oscillating in air, and which for example has been measured during manufacture or installation of the level sensor. By means of this comparison, the evaluation circuit can thus determine whether the predetermined material level in the container has been reached or not. If the measured frequency of the square-wave signal A has not reached a threshold value, for example 10% below the nominal frequency, it is assumed that the oscillatory rods of the level sensor are covered with the material; if, on the other hand, the threshold value is exceeded, it is assumed that the oscillatory rods are oscillating in air.

The evaluation circuit can also detect certain faults in the material level monitoring arrangement from the frequency measured by it. If no more pulses are received, that is, if the frequency measured is zero, this means a complete failure of the device. If the frequency measured is significantly higher than the nominal frequency, then it can be suspected that the oscillatory rods have been shortened through corrosion or breakage. In such cases, the evaluation circuit can give an alarm signal. However, there are also faults that cannot be detected in this way, because they can lead to frequency values that are within the range of possible frequency values. Such faults can be caused, for example, by long-term changes (degradation) and ageing phenomena in the components of the sensor and in the circuit elements of the electronic circuit arrangement. If the oscillation frequency of the sensor is reduced by such a fault, it is possible for the evaluation circuit erroneously to indicate that the oscillatory rods are covered by the material, that is, that the predetermined level has been reached, even though the oscillatory rods are in fact oscillating in air. If, on the other hand, the oscillation frequency of the sensor is increased by such a fault, it is possible for the evaluation circuit erroneously to indicate that the oscillatory rods are oscillating in air, that is, the predetermined level has not been reached, even though the oscillatory rods are in fact covered by the material.

To ensure that such faults can also be detected, a switch 26 is inserted in the connection between the output of the amplifier circuit 20 and the terminal 18 of the excitation transducer 12 in the circuit arrangement in FIG. 1, and the terminal 18 is connected to the input of a second amplifier circuit 40, at the output of which a second input of the differentiating circuit 30 is connected. In the embodiment shown in FIG. 1, the amplifier circuit 40 contains only one amplifier 41, which is designed as a limiter amplifier in the same way as the output amplifier 23 of the amplifier circuit 20, and supplies a square-wave signal B, which is in phase with the alternating voltage signal at terminal 18. This square-wave signal B, which is illustrated in diagram B of FIG. 2, is also converted into short pulses in the differentiating circuit 30 by a second differentiating element 37, which consists of a resistor 38 connected in series with a capacitor 39; these short pulses are applied to the parallel circuit consisting of the resistor 34 and the diode 35, and thus to the base of transistor 36. As in the case described above of the short pulses produced by differentiating element 31 from the square-wave signal A, the positively directed pulses corresponding to the rising edges of the square-wave signal B also produce short negatively directed pulses in the collector of the transistor 36, while the negatively directed pulses corresponding to the falling edges of square-wave signal B are suppressed. The transistor 36 works as a combination circuit, which combines the pulse trains produced by the two differentiating elements 31 and 37 into a combined pulse train, which forms the output pulse train C.

Furthermore, the arrangement of FIG. 1 contains a control circuit 50, which supplies a control signal D to actuate switch 26. The same control signal D is also applied to the evaluation circuit 25. The switch 26, which in the drawing is symbolically represented by a mechanical switch contact, is preferably a fast electronic switch, for example a field-effect transistor. The control signal D, which is shown in diagram D of FIG. 2, is a binary signal which can be either of a low or a high signal value. In the illustrated embodiment it is assumed that the switch 26 is closed when the control signal D has a low signal value, and that it is opened when the control signal D has a high signal value.

During normal measuring operation, the control circuit 50 gives the control signal D the low signal value, so that switch 26 is closed. In this condition, which is illustrated in the left-hand part of the diagrams in FIG. 2, the sensor 10 is situated in the closed feedback loop of the amplifier circuit 20, so that it is excited to oscillate with its self-resonant frequency in the manner described above. The voltage at terminal 18 is then identical with the output voltage of the amplifier circuit, and consequently the square-wave voltage B applied to the output of the amplifier circuit 40 is in phase with the square-wave voltage A at the output of the amplifier circuit 20. The short pulses produced by the differentiating element 31, which correspond to the edges of the square-wave voltage A, therefore coincide in time with the short pulses produced by the differentiating element 37, which correspond to the edges of the square-wave voltage B. The pulse train C supplied from the output of the differentiating circuit 30 to the evaluation circuit 25 in this operating status is therefore identical with the pulse train which would be supplied if the connection from terminal 18 via the amplifier circuit 40 to the differentiating circuit 30 did not exist. The evaluation circuit 25, which has been informed by the control signal D supplied by control circuit 50 that the monitoring arrangement is working in normal measuring mode, can thus determine the oscillation frequency of the level sensor 10 from the pulse train C in the manner described above, for example by counting the pulses occurring in predetermined time intervals.

The control circuit 50 can switch the monitoring arrangement from normal measuring mode to test mode by giving control signal D a high signal value, so that the switch 26 is opened. This interrupts the excitation of the mechanical oscillations of the level sensor 10 by the amplifier circuit 20, but the mechanical oscillatory structure 11 initially continues to oscillate with gradually weakening oscillation amplitude. The reception transducer 13 therefore continues to supply an alternating voltage to the amplifier circuit 20, so that the square-wave voltage A initially continues to exist at this output. The excitation transducer 12, however, now also works as a reception transducer, so that it supplies an alternating voltage from terminal 18 to the amplifier circuit 40; this alternating voltage is identical in frequency and phase with the alternating voltage supplied by the reception transducer 13 at terminal 19. Since, however, the alternating voltage in the amplifier circuit 40 receives no phase shift, while the alternating voltage in the amplifier circuit 20 receives a phase shift of 90°, the square-wave signal B delivered at the output of the amplifier circuit 40 has a phase shift of 90° in relation to the square-wave signal A delivered at the output of the amplifier circuit 20, as can be seen from the right-hand side of the diagrams in FIG. 2. Consequently, the edges of the square-wave signals and thus also the pulses derived by the differentiating elements 31 and 37 from the square-wave signals no longer coincide in time. In the combined pulse train C supplied from the differentiating circuit 30 to the evaluation circuit 25, the pulses originating from square-wave signal A and the pulses originating from square-wave signal B appear separately with a relative phase shift. If the evaluation circuit 25 determines the oscillation frequency by counting the pulses occurring within a certain interval, it will therefore count double the number of pulses in each interval compared with normal measuring mode, and thus measure double the frequency.

Since, however, the evaluation circuit also receives the control signal D with the high signal value, it is informed that the monitoring arrangement is now working in test mode, and it can evaluate the change in pulse train C for test purposes. The monitoring arrangement thus recognises a fault in the arrangement if double the pulse number does not occur in test mode. If double the pulse number does occur, but the pulses have a phase shift other than 90°, certain faults, such as a degradation of the components, can be recognised and evaluated from the size of the phase shift.

Since test mode is only possible as long as the mechanical oscillatory structure of the level sensor oscillates with sufficient amplitude, test operation is preferably restricted to relatively short test intervals. This gives rise to the further advantage that material level monitoring is practically uninterrupted, since the oscillation frequency can also be determined during test operation from the square-wave signals supplied if no fault has occurred. The test intervals can be triggered either automatically at predetermined intervals, or manually as required.

Figure 3:
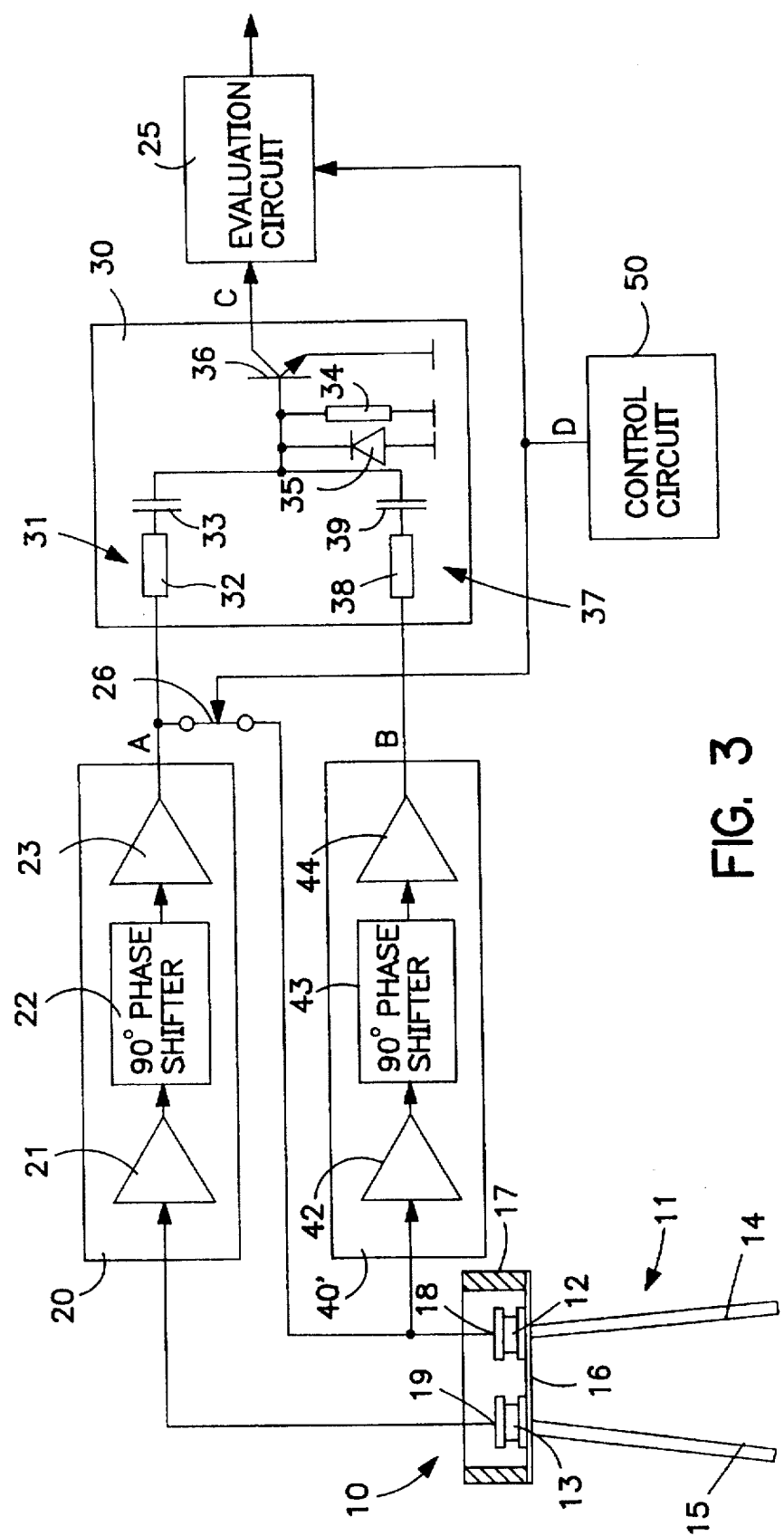
FIG. 3 illustrates the block diagram of a modified embodiment of the arrangement of FIG. 1
Figure 4:
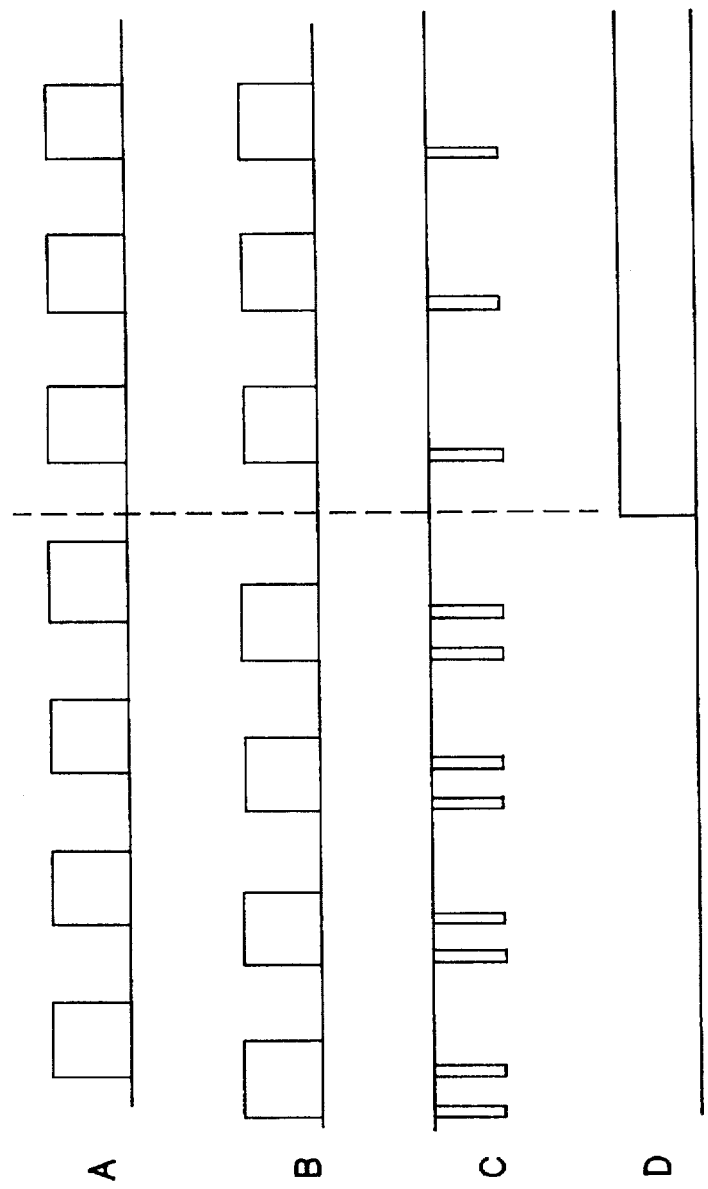
FIG. 4 illustrates time-dependency diagrams of signals occurring in the arrangement of FIG. 3.

FIG. 3 illustrates a modified embodiment of the monitoring arrangement, and the diagrams in FIG. 4 illustrate the time characteristics of the corresponding signals in the same way as in FIG. 2. The corresponding components and signals are identified in FIG. 3 in the same way as in FIG. 1, and are not described again. The arrangement of FIG. 3 differs from that of FIG. 1 only through a modified amplifier circuit 40': in the same way as amplifier circuit 20, this now includes a preamplifier 42, a 90° phase shifter 43 and an output amplifier 44. Since this imparts to the alternating voltage supplied by terminal 18 a phase shift of 90°, the result is the difference in the phase angle of the square-wave signals A and B, which can be seen from the diagrams in FIG. 4: in normal measuring mode, the square-wave signal B has a phase shift of 90° in relation to square-wave signal A, and consequently the pulses coming from the two square-wave signals A and B appear separately in the output pulse train C, with a relative phase shift of 90°; in test mode, on the other hand, the square-wave signals A and B are in phase, so that the pulses coming from them coincide in time if there is no fault. It can be clearly seen that in this embodiment, level monitoring and fault detection are possible in the same way as in the embodiment in FIG. 1: in normal measuring mode, the oscillation frequency can naturally also be correctly determined from double the pulse number, and in test mode the existence of a fault is recognised by the pulse number not being halved, with the type of fault being identified on the basis of the size of phase shift between the pulses of each pair. The embodiment in FIG. 3 has the advantage over that of FIG. 1 that through the 90° phase shifter 43 with low pass character signal fractions caused by the transmission of structure-borne noise (e.g. vibrations from machines) from the container to the level sensor 10 are filtered out when the switch 26 is open. This measure leads to a substantial expansion in the field of application of the level monitoring arrangement.

Of course it is possible to modify the embodiments, which have only been given as examples. Thus, for example, the differentiating circuit 30 can be designed other than with RC elements, for example with monostable elements, which are familiar to the expert. Furthermore, the connection between the control circuit 50 and the evaluation circuit 25 can be omitted, since the evaluation circuit 25 can synchronise itself with the switchover clock signal generated by the control circuit 50 by means of the changes in the output signal C of the differentiating circuit 30. It must be noted that the evaluation circuit 25 is often located at a considerable distance from the level sensor 10, whereas the other components of the illustrated circuitry are located at the site of the level sensor as local electronics. In such cases it is favourable if no further line is required for transmitting the control signal D to the evaluation device 25 in addition to the line for transmitting the signal C.

In all cases, the evaluation of the measuring signals can be carried out in a manner other than converting square-wave signals into pulse trains. The essential factor in the manner of functioning described above is that the excitation circuit is interrupted in each test interval, and that a phase comparison is performed between the output signal of the reception transducer 13 and the output signal of the excitation transducer 12, which then also works as a reception transducer. In this phase comparison, changes in phase effected in the signal paths must, of course, be taken into account.

I claim:

1. A method for determining and/or monitoring a predetermined level of material in a container with a level sensor having a mechanical oscillatory structure mounted at the height of the predetermined level of material in such a way that it comes into contact with the material when the material reaches the predetermined level, an electromechanical excitation transducer, an electromechanical reception transducer, an amplifier circuit having an input and an output, an electrical connection connecting the input of the amplifier circuit to the reception transducer, and an electrical connection connecting the output of the amplifier circuit to the excitation transducer so that the mechanical oscillatory structure is excited to oscillate at the mechanical oscillatory structure self-resonant frequency, the method comprising: periodically interrupting the electrical connection connecting the output of the amplifier circuit to the excitation transducer, during each interruption comparing the phase of an output signal from the output of the amplifier circuit to the phase of a signal from the excitation transducer to recognize a fault in the method for determining and/or monitoring the predetermined level.

2. The method in accordance with claim 1 wherein the output signal of the amplifier circuit is converted into a pulse train having a repetition frequency identical with the frequency of the output signal of the amplifier circuit, the signal from the excitation transducer is also converted into a pulse train, the two pulse trains are combined to form a combined pulse train, and comparison of the output signal of the amplifier circuit and the signal from the excitation transducer is made on the basis of the pulses in the combined pulse train.

3. An arrangement for determining and/or monitoring a predetermined level of material in a container comprising: a level sensor having a mechanical oscillatory structure mounted at the height of the predetermined level of material in such a way that it comes in contact with the material when the material reaches the predetermined level, an electromechanical excitation transducer, an electromechanical reception transducer, a first amplifier circuit having an input and an output, an electrical connection connecting the reception transducer to the input of the first amplifier circuit, an electrical connection connecting the excitation transducer to the output of the first amplifier circuit and providing a feedback loop so that the mechanical oscillatory structure is excited to oscillate at the mechanical oscillatory structure self-resonant frequency, an evaluation circuit, an electrical connection connecting the output of the first amplifier circuit to the evaluation circuit, an electrical connection connecting the excitation transducer to the evaluation circuit, a switch in the connection between the output of the first amplifier circuit and the excitation transducer for opening and closing the feedback loop, a control circuit for controlling the switch to open the feedback loop at predetermined intervals so that during each such interval the evaluation circuit compares the phase of an output signal from the first amplifier circuit to the phase of a signal from the excitation transducer to recognize a fault in the arrangement for determining and/or monitoring the predetermined level of the material.

4. The arrangement in accordance with claim 3 wherein the output of the amplifier circuit and the reception transducer are each connected to the evaluation circuit through a differentiating circuit having an output connected to the evaluation circuit.

5. The arrangement in accordance with claim 3 wherein the electrical connection between the excitation transducer and the evaluation circuit includes a second amplifier circuit having an output that provides an output signal that is used for the phase comparison.

6. The arrangement in accordance with claim 5, wherein the output signal of the amplifier has a phase shift and the second amplifier circuit produces an output signal having the same phase shift as the output signal of the first amplifier circuit.

7. The arrangement in accordance with claim 4, wherein the electrical connection between the excitation transducer and the evaluation circuit includes a second amplifier circuit having an output that provides an output signal that is used for the phase comparison.

8. The arrangement in accordance with claim 7, wherein the output signal of the amplifier has a phase shift and the second amplifier circuit produces an output signal having the same phase shift as the output signal of the first amplifier circuit.

* * * * *